US 12,294,218 B2

United States Patent
Wu et al.

(10) Patent No.: US 12,294,218 B2
(45) Date of Patent: May 6, 2025

(54) FULL-DISTRIBUTED REACTIVE VOLTAGE CONTROL METHOD AND DEVICE, AND STORAGE MEDIUM

(71) Applicant: TSINGHUA UNIVERSITY, Beijing (CN)

(72) Inventors: Wenchuan Wu, Beijing (CN); Siyun Li, Beijing (CN); Bin Wang, Beijing (CN); Hongbin Sun, Beijing (CN); Qinglai Guo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 272 days.

(21) Appl. No.: 18/188,553

(22) Filed: Mar. 23, 2023

(65) Prior Publication Data

US 2023/0307912 A1  Sep. 28, 2023

(30) Foreign Application Priority Data

Mar. 25, 2022 (CN) .......................... 202210300394.7

(51) Int. Cl.
*H02J 3/18* (2006.01)
*G06F 113/04* (2020.01)

(52) U.S. Cl.
CPC ............ *H02J 3/18* (2013.01); *G06F 2113/04* (2020.01); *H02J 2203/10* (2020.01); *H02J 2203/20* (2020.01)

(58) Field of Classification Search
CPC ...... H02J 3/18; H02J 2203/10; H02J 2203/20; G06F 2113/04
See application file for complete search history.

(56) References Cited

PUBLICATIONS

Translation of CN-112609435-A, Xia, 2021-0406.*
Translation of CN-1116000315-A, Lu, Aug. 28, 2020.*
Translation of WO 2019184132-A1, Kang, Oct. 3, 2019.*
Translation of CN-109861291-A, Chi, Jun. 7, 2019.*

\* cited by examiner

*Primary Examiner* — Harry R Behm
(74) *Attorney, Agent, or Firm* — Hodgson Russ LLP (57) ABSTRACT

A fully-distributed reactive voltage control method, includes: establishing a power grid reactive voltage optimization model of a power grid; parting the power grid reactive voltage optimization model into a plurality of area reactive voltage optimization models of a plurality of areas of the power grid; converting a power flow equation constraint in each of the plurality of area reactive voltage optimization models to a linear regression model; solving the linear regression model by using a robust recursive regression algorithm to obtain a solution result of the linear regression model; solving each of the plurality of area reactive voltage optimization models by using the solution result of the linear regression model, a gradient projection algorithm, and an alternating direction multiplier algorithm, so as to realize a reactive voltage optimization control of each of the plurality of areas.

8 Claims, 1 Drawing Sheet

FULL-DISTRIBUTED REACTIVE VOLTAGE CONTROL METHOD AND DEVICE, AND STORAGE MEDIUM

CROSS-REFERENCE TO RELATED APPLICATION

This application claims priority to Chinese Patent Application No. 202210300394.7, filed on Mar. 25, 2022, the entire disclosure of which is incorporated herein by reference.

TECHNICAL FIELD

The disclosure relates to the field of power system operation and control technologies, and more particularly, to a fully-distributed reactive voltage control method, an electronic device, and a storage medium.

BACKGROUND

Driven by energy and environmental issues, a proportion of clean and renewable distributed generators (DGs) is increasing in a power grid and the integration of large-scale, high-penetration DGs into the power grid has become current issues and hotspots in the international energy and power field. Due to the large dispersion and strong volatility of DGs, it has brought a series of negative effects on the voltage quality and dispatching operation of the distribution network and even the transmission network in the power grid. At the same time, DGs are often connected to the power grid through power electronic inverters, which has flexible and high-speed adjustment capabilities. To efficiently control DGs and improve the voltage quality of the high-penetration power grid, the reactive voltage control has become an important part of regulation and operation of the power grid. In the traditional power grid, the centralized optimization method based on the power grid model is used to realize the reactive voltage control, which can improve the network loss of the controlled power grid while eliminating the voltage limit.

However, the centralized optimization control method often faces key problems such as single-node failure, high communication burden, high computing burden, and serious influences caused by communication delay. Moreover, for multiple stakeholders in the power grid, the centralized method may not protect the data privacy of each stakeholder. Especially, in the high-penetration power grid, many controlled DGs and the complex network structure severely limit the centralized method and may not reasonably control high-speed resources.

SUMMARY

The disclosure aims to overcome deficiencies in the related art and proposes a fully-distributed reactive voltage control method, an electronic device, and a storage medium, for a power grid with a plurality of areas. The disclosure has flexible characteristics of fully-distributed control to realize fast reactive voltage control and does not need accurate system model parameters to realize model-free optimal reactive voltage control. The disclosure also has the robustness for the measured bad data by considering bad data in the power grid measurement, greatly improves the voltage quality of the power grid and reduces the network loss of the power grid operation.

A first aspect of the disclosure provides a fully-distributed reactive voltage control method, which includes: establishing a power grid reactive voltage optimization model of a power grid; parting the power grid reactive voltage optimization model into a plurality of area reactive voltage optimization models of a plurality of areas of the power grid; converting a power flow equation constraint in each of the plurality of area reactive voltage optimization models to a linear regression model; solving the linear regression model by using a robust recursive regression algorithm to obtain a solution result of the linear regression model; solving each of the plurality of area reactive voltage optimization models by using the solution result of the linear regression model, a gradient projection algorithm, and an alternating direction multiplier algorithm, so as to realize a reactive voltage optimization control of each of the plurality of areas.

In a specific embodiment of the disclosure, establishing the power grid reactive voltage optimization model by a formula of:

$$\min f = \alpha_1 \|v^t - v^{ref}\|^2 + \alpha_2 p_{PCC}^t$$

$$h(x^t, y^t) \leq 0$$

$$y^t = g(x^t) \tag{1}$$

where:
$f$ represents an objective function of the power grid reactive voltage optimization model,
superscript t represents time,
$v^t$ represents a vector formed by voltages of controllable nodes in the power grid at time t,
$v^{ref}$ represents an expected voltage profile of controllable nodes in the power grid,
$p_{PCC}^t$ represents an active power at a point of common coupling (PCC) of the power grid at time t,
$x^t$ represents a vector formed by control variables in the power grid at time t,
$y^t$ represents a vector formed by state variables in the power grid at time t,
$h(\cdot)$ represents operational constraints,
$g(\cdot)$ represents power flow equation constraints that the power grid needs to satisfy,
$\alpha_1$ represents a penalty coefficient of a voltage regulation cost, and
$\alpha_2$ represents a penalty coefficient of an active power loss.

In a specific embodiment of the disclosure, parting the power grid reactive voltage optimization model into the plurality of area reactive voltage optimization models of the plurality of areas of the power grid comprises:

noting N areas in the power grid, wherein a set of nodes in the power grid is expressed as $I := \cup_{a=1}^{N} I^a$, $I^a$ represents a set of nodes in an $a^{th}$ area in the power grid; a set of distributed generators (DGs) in the power grid is expressed as $G := \cup_{a=1}^{N} G^a$, and $G^a$ represents a set of DGs in the $a^{th}$ area in the power grid;

for the $a^{th}$ area where $a \in [1, N]$, denoting $y_a^t$ as a vector formed by state variables in the $a^{th}$ area at time t, wherein $y_a^t$ comprises internal variables $y_{a,int}^t$ and boundary variables $y_{a,adj}^t$, the boundary variables $y_{a,adj}^t$ comprise parameters of overlapping parts of the $a^{th}$ area and other areas adjacent to the $a^{th}$ area at time t, $y_{a,adj}^t$ comprise node voltage amplitudes, branch active powers, and branch reactive powers of the overlapping parts of the $a^{th}$ area and the other areas; $y_{a,adj}^t := \cup_{b \in O^a} y_{a,b}^t$, $y_{a,b}^t$ represents node voltage amplitudes, branch active powers, and branch reactive powers of an overlapping part of the $a^{th}$ area and a $b^{th}$ area, and $O^a$ represents a set of the other areas adjacent to the $a^{th}$ area; for the $a^{th}$ area where $a \in \{2, \ldots, N\}$ and that does not comprise the PCC, $y_{a,int}^t$ represents a vector formed by voltages of internal controllable nodes in the $a^{th}$ area at time t; and for the $a^{th}$ area where a=1 and that comprises the PCC, $y_{a,int}^t$ represents a vector formed by voltages of internal controllable nodes in the $a^{th}$ area at time t and a measurement value of the active power of the PCC at time t;

for the $a^{th}$ area, where $a \in [1, N]$ establishing the area reactive voltage optimization model by a formula of:

$$\min_{x_a^t \in \chi_a^t} f_a(x_a^t) = \frac{1}{2}\left(\alpha_1 \|v_a^t - v_a^{ref}\|^2 + \alpha_2 p_{a\Sigma}^t\right) \quad (2)$$

$$y_a^t = \hat{F}_a^t \times \begin{bmatrix} x_a^t \\ 1 \end{bmatrix}$$

$$y_{a,b}^t = s_{a,b}^t \, \forall \, b \in O^a$$

where:

$f_a$ represents an objective function of the area reactive voltage optimization model of the $a^{th}$ area, $v_a^t$ represents a vector formed by voltages of controllable nodes in the $a^{th}$ area at time t, $v_a^{ref}$ represents an expected voltage profile of controllable nodes in the $a^{th}$ area, $y_a^t$ represents a vector formed by state variables in the $a^{th}$ area at time t, $x_a^t$ represents a vector formed by control variables in the $a^{th}$ area at time t, $s_{a,b}^t$ represents values of boundary variables between the $a^{th}$ area and the $b^{th}$ area at time t, $\hat{F}_a^t$ represents a parameter matrix to be estimated corresponding to the $a^{th}$ area at time t after g(•) is linearized, control variables $x_a^t = q_{DGa}^t = \{Q_{Ga,i}^t | i \in G^a\}$ that represent reactive power outputs of DGs of the $a^{th}$ area at time t, $Q_{Ga,i}^t$ represents a reactive power output of a DG with a node number i of the $a^{th}$ area at time t, $q_{DGa}^t$ represents a vector formed by reactive power outputs of all DGs of the $a^{th}$ area at time t;

$p_{a\Sigma}^t$ satisfies $\Sigma_{a=1}^{N} p_{a\Sigma}^t = p_{PCC}^t$; wherein the power grid is regarded as a macro graph with the PCC as a root node, each area in the power grid is a child node of the macro graph, if $(i_a^0, j_a^0) \in L_a$ denotes a line connecting a node corresponding to the $a^{th}$ area and its parent node and $L_a^{lower-line} \subseteq L_a$ denotes a set of connection lines connecting the node corresponding to the $a^{th}$ area and its child nodes, $p_{a\Sigma}^t = p_{a(i_a^0, j_a^0)}^t - \Sigma_{(i,j) \in L_a^{lower-line}} p_{a(ij)}^t$, $p_{a(ij)}^t$ represents a branch active power on line (i, j) of the $a^{th}$ area at time t, and $p_{a(i_a^0, j_a^0)}^t$ represents a branch active power on line $(i_a^0, j_a^0)$ of the $a^{th}$ area at time t;

$\chi_a^t := \{\chi_{a,i}^t | i \in G^a\}$ represents a feasible zone of the reactive power output of the DG in the $a^{th}$ area at time t, wherein for DG $i \in G^a$ in the $a^{th}$ area at time t, a corresponding feasible zone of the reactive power output of the DG a is defined as a formula of:

$$|Q_{Ga,i}^t| \leq \sqrt{(S_{Ga,i}^t)^2 - (\overline{P}_{Ga,i}^t)^2} \quad (3)$$

wherein $S_{Ga,i}^t$ represents an installed capacity at DG i at time t, and $\overline{P}_{Ga,i}^t$ represents an active power at DG i at time t.

In a specific embodiment of the disclosure, converting the power flow equation constraint in each of the plurality of area reactive voltage optimization models to the linear regression model and solving the linear regression model by using the robust recursive regression algorithm to obtain the solution result of the linear regression model comprises:

1) expressing a measurement vector of the $a^{th}$ area at time t as $\tilde{y}_a^t = [\tilde{y}_{a,int}^t; \tilde{y}_{a,adj}^t]$, where $\tilde{y}_{a,int}^t$ represents measurement values of internal state variables of the $a^{th}$ area at time t, and $\tilde{y}_{a,adj}^t$ represents measurement values of boundary variables of the $a^{th}$ area at time t;

wherein for the $a^{th}$ area where $a \in \{2, \ldots, N\}$, $\tilde{y}_{a,int}^t = \{\tilde{v}_{a,i}^t | i \in I_{observe}^a\}$, $\tilde{v}_{a,i}^t$ represents a voltage amplitude measurement at an internal observable node i of the $a^{th}$ area at time t, and $I_{observe}^a \subseteq I^a$ represents a set of observable nodes that need to be controlled in the $a^{th}$ area;

for the $a^{th}$ area where a=1 and that connected to the PCC, $\tilde{y}_{a,int}^t = \{\tilde{v}_{a,i}^t; \tilde{p}_{PCC}^t | i \in I_{observe}^a\}$, $\tilde{p}_{PCC}^t$ represents a measurement value of the active power of the PCC at time t;

for corresponding system measurements of each area, establishing an initial linear regression model of each area by a formula of:

$$\tilde{y}_a^t = \hat{F}_a^t \times u_a^t + \hat{o}_a^t + v_a^t, \forall a \in [1, N] \quad (4)$$

where, $\hat{F}_a^t \in \mathbb{R}^{L^a \times (G^a+1)}$ represents the parameter matrix to be estimated in the $a^{th}$ area at time t, $\tilde{y}_a^t \in \mathbb{R}^{L^a}$ represents the measurement vector of the $a^{th}$ area at time t, $u_a^t = [(x_a^t)^T, 1]^T \in \mathbb{R}^{G^a+1}$ represents auxiliary variables of the $a^{th}$ area at time t, bad data in measurements in the $a^{th}$ area at time t are modeled as a sparse vector $\hat{o}_a^t \in \mathbb{R}^{L^a}$, $v_a^t \in \mathbb{R}^{L^a}$ represents an environmental noise vector in the $a^{th}$ area at time t, $L^a$ represents a number of measurements in the $a^{th}$ area, and $G^a$ represents a number of DGs in the $a^{th}$ area;

2) transforming the model established in step 1) into a corresponding robust least squares estimation problem model as a formula of:

$$\left(\hat{F}_a^t, \{\hat{o}_a^v\}_{v=1}^t\right) \in \underset{(F, \{o^v\}_{v=1}^t)}{\operatorname{argmin}} \sum_{v=1}^{t} \left[\frac{1}{2}\|\tilde{y}_a^v - Fu_a^t - o^v\|_{R_{noise,a}^{-1}}^2 + \lambda_{LASSO}^a \|o^v\|_1\right] \quad (5)$$

where, $\lambda_{LASSO}^a$ represents a set coefficient of the $a^{th}$ area, $R_{noise,a}$ represents a weight matrix that is set for an error of each measurement in the $a^{th}$ area, $R_{noise,a}^{-1}$ represents an inversion calculation value of the matrix $R_{noise,a}$;

3) for $\forall t \geq t_0 + 1$, converting the model established in step 2) into a regression model as a formula of:

$$\hat{o}_a^t \in \underset{o}{\operatorname{argmin}} \frac{1}{2}\left\|\tilde{y}_a^t - \hat{F}_a^{t-1} u_a^t - o\right\|^2 + \lambda_{LASSO}^a \|o\|_1 \quad (6)$$

$$\hat{F}_a^t := HRLS\left(\hat{F}_a^{t-1}, (u_a^t, \tilde{y}_a^t - \hat{o}_a^t)\right)$$

where, $t_0$ represents an initialization time parameter, HRLS $(\hat{F}_a^{t-1}, (u_a^t, \tilde{y}_a^t - \hat{o}_a^t))$ represents using a robust hierarchical recursive least squares for performing recursion and updating on a parameter matrix.

In a specific embodiment of the disclosure, before solving each of the plurality of area reactive voltage optimization models by using the solution result of the linear regression model, the gradient projection algorithm, and the alternating direction multiplier algorithm, the method further comprises:

initializing model parameters;
wherein initializing the model parameters comprises:
1) denoting a dual variable in the $a^{th}$ area and corresponding to the $b^{th}$ area as $\lambda_{a,b}{}^t$ and initializing $\lambda_{a,b}{}^t$, where $b \in O^a$;
2) setting the initialization time parameter $t_0$ wherein $t_0 > G^a$, and the $a^{th}$ area using $t_0$ to initialize linear estimation parameters as a formula of:

$$\left(\hat{F}_a^{t_0}, \{\hat{o}_a^v\}_{v=1}^{t_0}\right) \in \underset{\left(F, \{o^v\}_{v=1}^{t_0}\right)}{\operatorname{argmin}} \sum_{v=1}^{t_0}\left[\frac{1}{2}\|\tilde{y}_a^v - Fu_a^t - o^v\|_{R_{noise,a}^{-1}}^2 + \lambda_{LASSO}^a\|o^v\|_1\right] \quad (7)$$

where $u_a^v$, $\tilde{y}_a^v$, and $\hat{o}_a^v$ respectively represent values at time $t = v$ of $u_a^t$, $\tilde{y}_a^t$, and $\hat{o}_a^t$;
3) the $a^{th}$ area initializing local parameters as a formula of:

$$\tilde{\omega}_a^{t_0} := \|R_{noise,a}^{-1}\|\|R_{uu,t_0,a}\| + o'_{\tilde{\omega},a} \quad (8)$$

$$\hat{F}_a^{t_0/2} := \hat{F}_a^{t_0-1} - \frac{\alpha}{\tilde{\omega}_a^{t_0}} R_{noise,a}^{-1}\left(\hat{F}_a^{t_0-1} R_{uu,t_0,a} - R_{yu,t_0,a} + R_{\hat{o}u,t_0,a}\right) \quad (9)$$

$$\hat{F}_a^{t_0} := \hat{F}_a^{t_0/2} \quad (10)$$

wherein $\tilde{\omega}_a^{t_0}$ is a real number; $\hat{F}_a^{t_0/2}$ represents a matrix at time $t_0$ and is an intermediate variable; $o'_{\tilde{\omega},a}$ is an initialization parameter of the $a^{th}$ area; $R_{uu,t_0,a} = (1/(\Sigma_{v=1}^{t_0}\beta^{t_0-v}))\Sigma_{v=1}^{t_0}(\beta^{t_0-v}u_a^v(u_a^v)^T)$, $R_{yu,t_0,a} = (1/(\Sigma_{v=1}^{t_0}\beta^{t_0-v}))\Sigma_{v=1}^{t_0}(\beta^{t_0-v}\tilde{y}_a^v(u_a^v)^T)$, and $R_{\hat{o}u,t_0,a} = (1/(\Sigma_{v=1}^{t_0}\beta^{t_0-v}))\Sigma_{v=1}^{t_0}(\beta^{t_0-v}\hat{o}_a^v(u_a^v)^T)$, $\beta$ is a constant real number and represents a forgetting factor coefficient, $0 < \beta \le 1$.

In a specific embodiment of the disclosure, solving each of the plurality of area reactive voltage optimization models by using the solution result of the linear regression model, the gradient projection algorithm, and the alternating direction multiplier algorithm to realize the reactive voltage optimization control of each of the plurality of areas comprises:
1) obtaining the measurement vector $\tilde{y}_a^t$ of the $a^{th}$ area at time $t$;
2) making current auxiliary variables $u = u_a^t$, a current parameter matrix to be estimated $F = \hat{F}_a^t$, a current measurement vector of state variables $y = \tilde{y}_a^t$, a current dimension of the state variables $L = L^a$, and a current error weight matrix $R^{-1} = R_{noise,a}^{-1}$, wherein $u_a^t = [(x_a^t)^T, 1]^T$ represents an auxiliary vector of the $a^{th}$ area at time $t$;
using the robust hierarchical recursive least squares to perform the following calculations in sequence:

$$o^{0,1} = o^{0,2} = o^{v0} \quad (11)$$

$$o^0 = \left(o^{0,1} + o^{0,2}\right)/2 \quad (12)$$

$$o^{1/2,i} = \alpha_o o^0 + (1-\alpha_o)o^{0,i}, i \in \{1, 2\} \quad (13)$$

$$o^{1,1} = \left(R^{-1} + I/\lambda_o^a\right)^{-1}\left(R^{-1}(y - Fu) + o^{1/2,1}/\lambda_o^a\right) \quad (14)$$

$$[o^{1,2}]_d = [o^{1/2,2}]_d \cdot \left(1 - \frac{\lambda_{LASSO}^a \lambda_o^a}{\max\{\lambda_{LASSO}^a \lambda_o^a, |[o^{1/2,2}]_d|\}}\right), \forall d \in \{1, 2, \ldots, L\} \quad (15)$$

$$o^1 = \left(o^{1,1} + o^{1,2}\right)/2 \quad (16)$$

wherein, $\lambda_o^a$ is a positive real number, $o^{v0}$ is a vector representing an initial assignment of $\hat{o}_a^t$, $\alpha_0 \in (0.5, 1]$ is a real number, $\lambda_{LASSO}^a$ is a positive real number, $[o^{1,2}]_d$ represents a $d^{th}$ element in vector $o^{1,2}$, and $[o^{1/2,2}]_d$ represents a $d^{th}$ element in vector $o^{1/2,2}$;
3) letting a number of iterations $n = 2$ and performing the following iterative update steps:

$$o^{n/2,i} = o^{n-2/2,i} - \alpha_o o^{n-2} - (1-\alpha_o)o^{n-2,i} + o^{n-1}, i \in \{1, 2\} \quad (17)$$

$$o^{n,1} = \left(R^{-1} + I/\lambda_o^a\right)^{-1}\left(R^{-1}(y - Fu) + o^{n/2,1}/\lambda_o^a\right) \quad (18)$$

$$[o^{n,2}]_d = [o^{n/2,2}]_d \cdot \left(1 - \frac{\lambda_{LASSO}^a \lambda_o^a}{\max\{\lambda_{LASSO}^a \lambda_o^a, |[o^{n/2,2}]_d|\}}\right), \forall d \in \{1, 2, \ldots, L\} \quad (19)$$

$$o^n = \left(o^{n,1} + o^{n,2}\right)/2 \quad (20)$$

4) determining n:
if n is less than a set upper limit of iteration times $J_a$, letting $n = n+1$, and then returning to step 3);
if n is greater than or equal to $J_a$, stopping the iteration and outputting;
5) letting $\hat{F}^{t-2} = \hat{F}_a^{t-2}$, $\hat{F}^{t-1} = \hat{F}_a^{t-1}$, and using the robust hierarchical recursive least squares to perform the following calculations in sequence:

$$q^t := R_{uu,t}p^{t-1}, \; p^t := q^t/\|q_t\| \quad (21)$$

$$\tilde{\omega}^t := \|R_{noise,a}^{-1}\|(p^t)^T R_{uu,t} p^t + o'_{\tilde{\omega},a} \quad (22)$$

$$\hat{F}^{t/2} := \quad (23)$$
$$\hat{F}^{t-1} + \hat{F}^{t-2/2} - \hat{F}^{t-2} + \frac{\alpha}{\tilde{\omega}^{t-1}}R_{noise,a}^{-1}\left(\hat{F}^{t-2}R_{uu,t-1} - R_{yu,t-1} + R_{\hat{o}u,t-1}\right) - \frac{1}{\tilde{\omega}^t}R_{noise,a}^{-1}\left(\hat{F}^{t-1}R_{uu,t} - R_{yu,t} + R_{\hat{o}u,t}\right)$$

$$\hat{F}_a^t := \hat{F}^{t/2} \quad (24)$$

where $p^t$ represents a vector, when $t = t_0$, an initial value of $p^t$ is a matrix obtained by performing eigen decomposition on $u_a^{t_0}(u_a^{t_0})^T$, and when $t > t_0$, a calculation expression is shown in formula (21);
$q^t$ represents a vector, $\tilde{\omega}^t$ represents a real number, $\hat{F}^{t/2}$ represents a matrix corresponding to time t, $\hat{F}^{t-1}$ represents a matrix corresponding to time $t-1$, $\hat{F}^{t-2/2}$ and $\hat{F}^{t-2}$ represent matrixes corresponding to time $t-2$, all of which are intermediate variables in the robust hierarchical recursive least squares; $R_{uu,t} = (1/B^t)\Sigma_{v=t_0+1}^t\beta^{t-v}u_a^v(u_a^v)^T$, $R_{yu,t} = (1/B^t)\Sigma_{v=t_0+1}^t\beta^{t-v}\tilde{y}_a^v(u_a^v)^T$, $R_{\hat{o}u,t} = (1/B^t)\Sigma_{v=t_0+1}^t\beta^{t-v}\hat{o}_a^v(u_a^v)^T$, wherein $B^t := \Sigma_{v=t_0+1}^t\beta^{t-v}$;
6) according to the gradient projection algorithm, calculating control variables $x_a^{t+1}$ of the $a^{th}$ area at time $t+1$:

$$x_a^{t+1} = P_{\chi_a^t}\left(x_a^t - d \times \nabla_{x_a} L_a\right) \quad (25)$$

$$\nabla_{x_a} L_a = \nabla_{x_a} f_a|_{x_a^t} + \sum_{\forall b \in O^a}\left\{\hat{F}_{a,b}^t\left[(\lambda_{a,b}^t)^T + \frac{\rho}{2}(\tilde{y}_{a,b}^t - \hat{o}_{a,b}^t - s_{a,b}^t)\right]\right\} \quad (26)$$

$$\nabla_{x_a} f_a|_{x_a^t} = \alpha_1 \frac{\partial v_a^t}{\partial x_a}(v_a^t - v_a^{ref}) + \frac{\alpha_2}{2}\frac{\partial p_{a\Sigma}^t}{\partial x_a}p_{a\Sigma}^t|_{x_a^t} = \quad (27)$$
$$\alpha_1 \hat{F}_{a,v}^t(\tilde{v}_a^t - v_a^{ref} - \hat{o}_{a,v}^t) + \frac{\alpha_2}{2}\hat{F}_{a,p\Sigma}^t(\tilde{p}_{a\Sigma}^t - \hat{o}_{a,p\Sigma}^t)$$

where d represents a step size, $P_{\chi_a^t}(x_a^t - d \times \nabla_{x_a} L_a)$ represents an operator of the gradient projection algorithm; $\hat{F}_{a,b}^t$, $\hat{F}_{a,v}^t$, and $\hat{F}_{a,p\Sigma}^t$ respectively represent sub-matrixes associated with measurement values of boundary variables $\tilde{y}_{a,b}{}^t$, measurement values of voltages $\tilde{v}_a{}^t$, and measurement values of active powers $\tilde{p}_{a\Sigma}{}^t$ in $\hat{F}_a{}^t$, and $\hat{o}_{a,b}{}^t$, $\hat{o}_{a,v}{}^t$, and $\hat{o}_{a,p\Sigma}{}^t$ respectively represent sub-items associated with measurement values of boundary variables $\tilde{y}_{a,b}{}^t$, measurement values of voltages $\tilde{v}_a{}^t$, and measurement values of active powers $\tilde{p}_{a\Sigma}{}^t$ in $\hat{o}_a{}^t$;

7) executing $x_a{}^{t+1}$ by DGs of the $a^{th}$ area to realize the reactive voltage optimization control of the $a^{th}$ area;

8) calculating estimated values of boundary variables at time t+1 for all adjacent areas b∈$O^a$ by a formula of:

$$\hat{y}_{a,b}{}^{t+1} = \tilde{y}_{a,b}{}^t - \hat{o}_{a,b}{}^t \tag{28}$$

where $\hat{o}_{a,b}{}^t$ represents estimated values of bad data in measurements of boundary variables at time t, and is a sub-item corresponding to boundary variables in $\hat{o}_a{}^t$;

the $a^{th}$ area and the $b^{th}$ area exchange $\hat{y}_{a,b}{}^{t+1}$ and $\hat{y}_{b,a}{}^{t+1}$;

9) calculating local update consistency variables at time t+1 according to the following formula:

$$s_{a,b}^{t+1} = \frac{\hat{y}_{a,b}^{t+1} + \hat{y}_{b,a}^{t+1}}{2}, \forall b \in O^a \tag{29}$$

10) according to Nesterov accelerated gradient update method, updating the dual variable at time t+1:

$$\eta_{a,b}^{t+1} = \lambda_{a,b}^t + \rho(\hat{y}_{a,b}^{t+1} - s_{a,b}^{t+1}), \forall b \in O^a \tag{30}$$

$$\lambda_{a,b}^{t+1} = \eta_{a,b}^{t+1} + \frac{t_{ADMM}}{t_{ADMM} + 3}(\eta_{a,b}^{t+1} - \eta_{a,b}^t)$$

where $t_{ADMM}$ represents a number of iterations of the alternating direction multiplier algorithm combining the gradient projection algorithm, $\rho$ represents a penalty coefficient of the alternating direction multiplier algorithm, and $\eta_{a,b}{}^{t+1}$ represents an intermediate calculation variable corresponding to $\lambda_{a,b}{}^{t+1}$;

11) letting t=t+1, and then going back to step 1).

A second aspect of the disclosure provides an electronic device. The electronic device comprises a processor; and a memory for storing instructions executable by the processor; wherein the processor is configured to perform the above fully-distributed reactive voltage control method.

A third aspect of the disclosure provides a non-transitory computer-readable storage medium having stored therein instructions that, when executed by a processor of an electronic device, causes the electronic device to perform the above fully-distributed reactive voltage control method.

The features and beneficial effects of the disclosure may be as follows.

The disclosure proposes a data-driven fully-distributed framework combining the gradient projection algorithm and the alternating direction multiplier algorithm (ADMM). By adopting the feedback optimization control architecture, the real-time measurement data in the power grid are continuously collected, and a controller in each area adopts the measurement data to carry out robust regression to obtain linear relationships between control variables and state variables, and only exchanges limited boundary information with its adjacent areas, so as to calculate the control strategy of the area and execute the control instructions locally.

On one hand, the disclosure gives full play to advantages of speed and privacy protection of fully-distributed control, and the controller in each area only needs to communicate with adjacent areas in limited data and can perform rapid control according to real-time local measurement and robust regression results. It is especially suitable for reactive voltage control of high-speed DGs; on the other hand, a robust regression algorithm in the field of signal processing, namely the robust hierarchical recursive least squares (HRLS), is proposed to be applied to the online estimation of the linear power flow model of the power grid, which is robust to bad data that may exist in practical applications, has fast computing performance, ensures the optimal operation of the system in the case of incomplete models and obtains the optimal control strategy.

The disclosure greatly improves the efficiency, safety and flexibility of the power grid reactive voltage control method in the scenario of incomplete model, and is especially suitable for the use of the area grid with the serious model incompleteness problem, which not only saves the high cost caused by repeated maintenance of the accurate model, but also gives full play to the flexible and efficient advantages of distributed control. At the same time, it is robust to the measured bad data, avoiding the problems of single-node failure, high communication burden, high computing burden, and serious influences caused by communication delay, and it is suitable for large-scale promotion.

1. In the disclosure, the controller in each area only needs to carry out a small amount of data communication with the adjacent areas when performing the control operation, which can protect the data privacy of each area.
2. According to the real-time feedback of the power grid, the controller in each area in the disclosure quickly generates control instructions, the calculation cost of each step is low, the high-speed flexible resources can be efficiently utilized, and the efficiency of reactive voltage control is improved.
3. Based on the robust online estimation method, the disclosure can approximate the linear power flow model online, learn the characteristics of the power grid only through the control process data, perform model-free optimization, and still control the reactive distribution of the power grid to be in an optimized state in the case of incomplete models, and is robust to bad data that may appear in the measurement.

DETAILED DESCRIPTION

The disclosure provides a fully-distributed reactive voltage control method, an electronic device, and a storage medium, which are described in detail below with reference to the accompanying drawing and specific embodiments.

Figure 1:
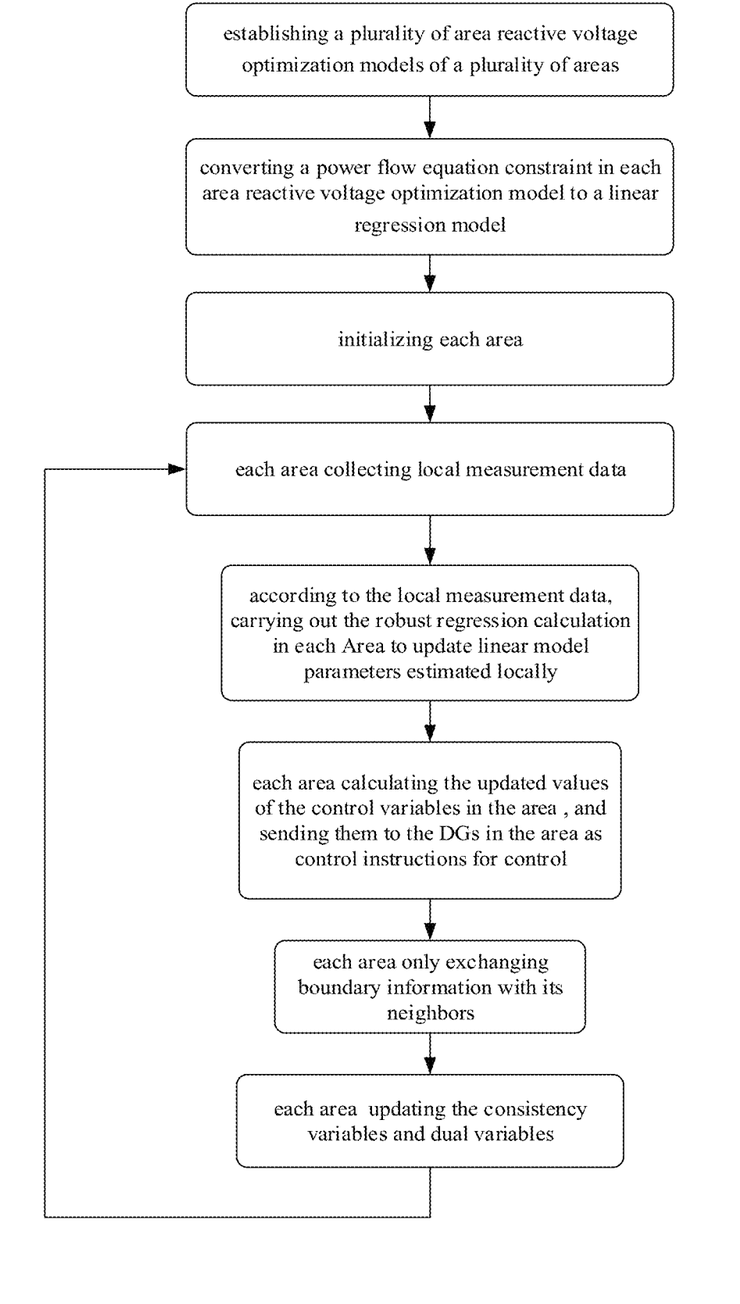
FIG. 1 is an overall flowchart of a fully-distributed reactive voltage control method in an embodiment of the disclosure.

Embodiments of the first aspect of the disclosure propose a fully-distributed reactive voltage control method. The overall process is shown in FIG. 1, including the following steps.

1) According to an overall reactive voltage control objective of a power grid, a power grid reactive voltage optimization model of the power grid is established and the power grid reactive voltage optimization model is parted into a plurality of area reactive voltage optimization models of a plurality of areas of the power grid. The specific steps are as follows.

1-1) The power grid reactive voltage optimization model is established by a formula of:

$$\min f = \alpha_1 \|v^t - v^{ref}\|^2 + \alpha_2 p_{PCC}^t$$

$$h(x^t, y^t) \leq 0$$

$$y^t = g(x^t) \quad (1)$$

where: $f$ represents an objective function of the power grid reactive voltage optimization model, superscript t represents time, $v^t$ represents a vector formed by voltages of controllable nodes in the power grid at time t, $v^{ref}$ represents an expected voltage profile of controllable nodes in the power grid, $p_{PCC}^t$ represents an active power at a point of common coupling (PCC) of the power grid at time t, $x^t$ represents a vector formed by control variables in the power grid at time t such as reactive power output values of the DGs, $y^t$ represents a vector formed by state variables in the power grid at time t such as node voltage, branch active power, branch reactive power, $h(\cdot)$ represents operational constraints including output constraints of the DGs, $g(\cdot)$ represents power flow equation constraints that the power grid needs to satisfy, $\alpha_1$ represents a penalty coefficient of a voltage regulation cost, and $\alpha_2$ represents a penalty coefficient of an active power loss. The specific values $\alpha_1$ and $\alpha_2$ should be determined according to actual conditions of the controlled power grid and actual control requirements, and typically, they can be taken as 10 and 8, respectively.

1-2) The optimization model established in step 1-1) is parted to the plurality of area reactive voltage optimization models of the plurality of areas of the power grid.

In a specific embodiment of the disclosure, the controlled power grid is divided into N areas according to actual controller installation situations. Each area represents a virtual power plant and is equipped with a local controller that can quickly acquire measurements in the area and be able to communicate with adjacent areas. Under this division, a set of nodes in the power grid is expressed as $I := \cup_{a=1}^{N} I^a$, $I^a$ represents a set of nodes in an $a^{th}$ area in the power grid; and a set of DGs in the power grid is expressed as $G := \cup_{a=1}^{N} G^a$, and $G^a$ represents a set of DGs in the $a^{th}$ area in the power grid.

For the $a^{th}$ area where $a \in [1, N]$, $y_a^t$ is denoted as a vector formed by state variables in the $a^{th}$ area at time t, in which $y_a^t$ includes internal variables $y_{a,int}^t$ and boundary variables $y_{a,adj}^t$. The boundary variables $y_{a,adj}^t$ include parameters of overlapping parts of the $a^{th}$ area and other areas adjacent to the $a^{th}$ area at time t. In detail, $y_{a,adj}^t$ include node voltage amplitudes, branch active powers, and branch reactive powers of the overlapping parts of the $a^{th}$ area and the other areas. $y_{a,adj}^t := \cup_{b \in O^a} y_{a,b}^t$, $y_{a,b}^t$ represents node voltage amplitudes, branch active powers, and branch reactive powers of an overlapping part of the $a^{th}$ area and a $b^{th}$ area, and $O^a$ represents a set of the other areas adjacent to the $a^{th}$ area. There are two cases for internal variables. For the $a^{th}$ area where $a \in \{2, \ldots, N\}$ and that does not include the PCC, $y_{a,int}^t$ represents a vector formed by voltages of internal controllable nodes in the $a^{th}$ area at time t; and for the $a^{th}$ area where $a=1$ and that includes the PCC, $y_{a,int}^t$ represents a vector formed by voltages of internal controllable nodes in the $a^{th}$ area at time t and a measurement value of the active power of the PCC at time t.

For the $a^{th}$ area, where $a \in [1, N]$ the area reactive voltage optimization model is established by a formula of:

$$\min_{x_a^t \in X_a^t} f_a(x_a^t) = \frac{1}{2}(\alpha_1 \|v_a^t - v_a^{ref}\|^2 + \alpha_2 p_{a\Sigma}^t) \quad (2)$$

$$y_a^t = \hat{F}_a^t \times \begin{bmatrix} x_a^t \\ 1 \end{bmatrix}$$

$$y_{a,b}^t = s_{a,b}^t \quad \forall b \in O^a$$

where: $f_a$ represents an objective function of the area reactive voltage optimization model of the $a^{th}$ area, $v_a^t$ represents a vector formed by voltages of controllable nodes in the $a^{th}$ area at time t, $v_a^{ref}$ represents an expected voltage profile of controllable nodes in the $a^{th}$ area, $y_a^t$ represents a vector formed by state variables in the $a^{th}$ area at time t, $x_a^t$ represents a vector formed by control variables in the $a^{th}$ area at time t. $s_{a,b}^t$ is a global variable vector and represents values of boundary variables between the $a^{th}$ area and the $b^{th}$ area at time t, $\hat{F}_a^t$ represents a parameter matrix to be estimated corresponding to the $a^{th}$ area at time t after $g(\bullet)$ is linearized, control variables $x_a^t = q_{DGa}^t = \{Q_{Ga,i}^t | i \in G^a\}$ that represent reactive power outputs of DGs of the $a^{th}$ area at time t, $Q_{Ga,i}^t$ represents a reactive power output of a DG with a node number i of the $a^{th}$ area at time t, $q_{DGa}^t$ represents a vector formed by reactive power outputs of all DGs of the $a^{th}$ area at time t; $p_{a\Sigma}^t$ satisfies $\Sigma_{a=1}^{N} p_{a\Sigma}^t = p_{PCC}^t$; in which the power grid is regarded as a macro graph with the PCC as a root node, each area in the power grid is a child node of the macro graph, if $(i_a^0, j_a^0) \in L_a$ denotes a line connecting a node corresponding to the $a^{th}$ area and its parent node and $L_a^{lower-line} \subseteq L_a$ denotes a set of connection lines connecting the node corresponding to the $a^{th}$ area and its child nodes, $p_{a\Sigma}^t = p_{a(i_a^0 j_a^0)}^t - \Sigma_{(i,j) \in L_a^{lower-line}} p_{a(ij)}^t$, $p_{a(ij)}^t$ represents a branch active power on line (i, j) of the $a^{th}$ area at time t, and $p_{a(i_a^0 j_a^0)}^t$ represents a branch active power on line $(i_a^0, j_a^0)$ of the $a^{th}$ area at time t;

$\chi_a^t := \{\chi_{a,i}^t | i \in G^a\}$ in formula (2) represents a feasible zone of the reactive power output of the DG in the $a^{th}$ area at time t, in which for DG $i \in G^a$ in the $a^{th}$ area at time t, a corresponding feasible zone of the reactive power output of the DG i is defined as a formula of:

$$|Q_{Ga,i}^t| \leq \sqrt{(S_{Ga,i}^t)^2 - (\overline{P}_{Ga,i}^t)^2} \quad (3)$$

$S_{Ga,i}^t$ represents an installed capacity at DG i at time t, and $\overline{P}_{Ga,i}^t$ represents an active power at DG i at time t.

2) According to the area reactive voltage control optimization model established in step 1) and the actual configuration of the power grid, a power flow equation constraint in each of the plurality of area reactive voltage optimization models is converted into a linear regression model, and the linear regression model is solved by using a robust recursive regression algorithm to obtain a solution result of the linear regression model. The specific steps are as follows.

2-1) A measurement vector of the $a^{th}$ area at time t is expressed as $\tilde{y}_a^t = [\tilde{y}_{a,int}^t; \tilde{y}_{a,adj}^t]$, where $\tilde{y}_{a,int}^t$ represents measurement values of internal state variables of the $a^{th}$ area at time t, and $\tilde{y}_{a,adj}^t$ represents measurement values of boundary variables of the $a^{th}$ area at time t. For the $a^{th}$ area where $a \in \{2, \ldots, N\}$, $\tilde{y}_{a,int}^t = \{\tilde{v}_{a,i}^t | i \in I_{observe}^a\}$, $\tilde{v}_{a,i}^t$ represents a voltage amplitude measurement at an internal observable node a of the $a^{th}$ area at time t, and $I_{observe}^a \subseteq I^a$ represents a set of observable nodes that need to be controlled in the $a^{th}$ area; for the $a^{th}$ area where a=1 and that connected to the PCC, $\tilde{y}_{a,int}{}^t = \{\tilde{v}_{a,i}{}^t;$ $\tilde{p}_{PCC}{}^t | i \in I_{observe}{}^a\}$, $\tilde{p}_{PCC}{}^t$ represents a measurement value of the active power of the PCC at time t.

For corresponding system measurements of each area, an initial linear regression model of each area is established by a formula of:

$$\tilde{y}_a{}^t = \hat{F}_a{}^t \times u_a{}^t + \hat{o}_a{}^t + v_a{}^t, \forall a \in [1,N] \tag{4}$$

where, $\hat{F}_a{}^t \in \mathbb{R}^{L^a \times (G^a+1)}$ represents the parameter matrix to be estimated in the $a^{th}$ area at time t, $\tilde{y}_a{}^t \in \mathbb{R}^{L^a}$ represents the measurement vector of the $a^{th}$ area at time t, $u_a{}^t = [(x_a{}^t)^T, 1]^T \in \mathbb{R}^{G^a+1}$ represents auxiliary variables of the $a^{th}$ area at time t, bad data in measurements in the $a^{th}$ area at time t are modeled as a sparse vector $\hat{o}_a{}^t \in \mathbb{R}^{L^a}$, $v_a{}^t \in \mathbb{R}^{L^a}$ represents an environmental noise vector in the $a^{th}$ area at time t, $L^a$ represents a number of measurements in the $a^{th}$ area, and $G^a$ represents a number of DGs in the $a^{th}$ area.

2-2) The model established in step 2-1) is converted into a corresponding robust least squares estimation problem model as a formula of:

$$\left(\hat{F}_a^t, \{\hat{o}_a^v\}_{v=1}^t\right) \in \underset{(F, \{o^v\}_{v=1}^t)}{\arg\min} \sum_{v=1}^t \left[\frac{1}{2}\|\tilde{y}_a^v - Fu_a^t - o^v\|_{R_{noise,a}^{-1}}^2 + \lambda_{LASSO}^a \|o^v\|_1\right] \tag{5}$$

where, $\lambda_{LASSO}{}^a$ represents a set coefficient of the $a^{th}$ area, and the value of the coefficient depends on the sparseness of the actual bad data vector, which can be adjusted according to actual situations, and the typical value can be taken as 0.1. $R_{noise,a}$ represents a weight matrix that is set for an error of each measurement in the $a^{th}$ area, $R_{noise,a}{}^{-1}$ represents an inversion calculation value of the matrix $R_{noise,a}$. If the precision information of each measurement data is known, the data with the higher measurement precision can be given the higher weight; and if the precision information of each measurement data is unknown, the weight matrix can be set as the identity matrix.

2-3) For $\forall t \geq t_0+1$, the model established in step 2) is converted into a two-step regression model:

$$\hat{o}_a^t \in \arg\min \frac{1}{2}\left\|\tilde{y}_a^t - \hat{F}_a^{t-1} u_a^t - o\right\|^2 + \lambda_{LASSO}^a \|o\|_1 \tag{6}$$

$$\hat{F}_a^t := HRLS\left(\hat{F}_a^{t-1}, (u_a^t, \tilde{y}_a^t - \hat{o}_a^t)\right)$$

where, $t_0$ represents initialization time parameter, HRLS $(\hat{F}_a^{t-1}, (u_a{}^t, \tilde{y}_a{}^t - \hat{o}_a{}^t))$ represents using a robust hierarchical recursive least squares for performing recursion and updating on a parameter matrix.

3) The related control process variables and model parameters are initialized.

For the $a^{th}$ area where $a \in [1, N]$, the specific steps are as follows.

3-1) A dual variable in the $a^{th}$ area and corresponding to the $b^{th}$ area is denoted as $\lambda_{a,b}{}^t$ and $\lambda_{a,b}{}^t$ is initialized, where $b \in O^a$. The typical initialization value can be taken as a zero vector.

3-2) Let the initialization time parameter be $t_0$ where $t_0 > G^a$, and the $a^{th}$ area uses $t_0$ to initialize linear estimation parameters as a formula of:

$$\left(\hat{F}_a^{t_0}, \{\hat{o}_a^v\}_{v=1}^{t_0}\right) \in \underset{(F, \{o^v\}_{v=1}^{t_0})}{\arg\min} \sum_{v=1}^{t_0} \left[\frac{1}{2}\|\tilde{y}_a^v - Fu_a^t - o^v\|_{R_{noise,a}^{-1}}^2 + \lambda_{LASSO}^a \|o^v\|_1\right] \tag{7}$$

where $u_a{}^v$, $\tilde{y}_a{}^v$, and $\hat{o}_a{}^v$ respectively represent values at time t=v of $u_a{}^t$, $\tilde{y}_a{}^t$, and $\hat{o}_a{}^t$.

3-3) The $a^{th}$ area initializes local parameters as a formula of:

$$\tilde{\omega}_a^{t_0} := \|R_{noise,a}^{-1}\| \|R_{uu,t_0,a}\| + \hat{o}_{\omega,a} \tag{8}$$

$$\hat{F}_a^{t_0/2} := \hat{F}_a^{t_0-1} - \frac{\alpha}{\tilde{\omega}_a^{t_0}} R_{noise,a}^{-1}\left(\hat{F}_a^{t_0-1} R_{uu,t_0,a} - R_{yu,t_0,a} + R_{\hat{o}u,t_0,a}\right) \tag{9}$$

$$\hat{F}_a^{t_0} := \hat{F}_a^{t_0/2} \tag{10}$$

where $\tilde{\omega}_a^{t_0}$ is a real number; $\hat{F}_a^{t_0/2}$ represents a matrix at time $t_0$ and is an intermediate variable and only represents the symbol in the intermediate steps of mathematical iterative calculation. The computation steps in (8)-(10) follow the initialization steps in the HRLS.

$\hat{o}_{\tilde{\omega},a}$ is an initialization parameter of the $a^{th}$ area; $R_{uu,t_0,a} = (1/(\Sigma_{v=1}^{t_0}\beta^{t_0-v}))\Sigma_{v=1}^{t_0}(\beta^{t_0-v}u_a{}^v(u_a{}^v)^T)$, $R_{yu,t_0,a} = (1/(\Sigma_{v=1}^{t_0}\beta^{t_0-v}))\Sigma_{v=1}^{t_0}(\beta^{t_0-v}\tilde{y}_a{}^v(u_a{}^v)^T)$, and $R_{\hat{o}u,t_0,a} = (1/(\Sigma_{v=1}^{t_0}\beta^{t_0-v}))\Sigma_{v=1}^{t_0}(\beta^{t_0-v}\hat{o}_a{}^v(u_a{}^v)^T)$, $\beta$ is a constant real number and represents a forgetting factor coefficient, $0 < \beta \leq 1$.

4) The local controller of each area executes the following control steps at time t to realize the reactive voltage optimal control of this area. Each area executes in parallel without interfering with each other.

For the $a^{th}$ area, the specific steps are as follows.

4-1) The measurement vector $\tilde{y}_a{}^t$ of the $a^{th}$ area at time t is obtained by obtaining a measurement signal from a measurement device of the area.

4-2) According to the local measurement vector $\tilde{y}_a{}^t$, the auxiliary vector $u_a{}^t = [(x_a{}^t)^T, 1]^T$ represented by control variables, and the set initialization parameters, it makes current auxiliary variables $u = u_a{}^t$, a current parameter matrix to be estimated $F = \hat{F}_a{}^t$, a current measurement vector of state variables $y = \tilde{y}_a{}^t$, a current dimension of the state variables $L = L^a$, and a current error weight matrix $R^{-1} = R_{noise,a}{}^{-1}$.

Then the robust hierarchical recursive least squares may be used to perform the following calculations in sequence:

$$o^{0,1} = o^{0,2} = o^{v0} \tag{11}$$

$$o^0 = (o^{0,1} = o^{0,2})/2 \tag{12}$$

$$o^{1/2,i} = \alpha_o o^0 + (1 - a_o) o^{0,i}, i \in \{1, 2\} \tag{13}$$

$$o^{1,1} = (R^{-1} + I/\lambda_o^a)^{-1}(R^{-1}(y - Fu) + o^{1/2,1}/\lambda_o^a) \tag{14}$$

$$[o^{1,2}]_d = [o^{1/2,2}]_d \cdot \left(1 - \frac{\lambda_{LASSO}^a \lambda_o^a}{\max\{\lambda_{LASSO}^a \lambda_o^a, |[o^{1/2,2}]_d|\}}\right), \forall d \in \{1, 2, \ldots, L\} \tag{15}$$

$$o^1 = (o^{1,1} + o^{1,2})/2 \tag{16}$$

$o^{0,1}$ and $o^{0,2}$ in formula (11) are initialized to $o^{v0}$ which has been defined above; $o^{0,1}$ and $o^{0,2}$ correspond to the situation of $o^{n,1}$ and $o^{n,2}$ when n=0 respectively, which are intermediate variables in the iterative calculation steps.

In formula (13), i takes 1 and 2, indicating that the two variables $o^{1/2,1}$ and $o^{1/2,2}$ take the same calculation steps of this formula, representing the intermediate variables in the mathematical calculation steps.

$\lambda_o{}^a$ is a positive real number, $o^{v0}$ is a vector representing an initial assignment of $\hat{o}_a{}^t$, $\alpha_0 \in (0.5, 1]$ is a real number, $\lambda_{LASSO}{}^a$ is a positive real number, $[o^{1,2}]_d$ represents a $d^{th}$ element in vector $o^{1,2}$, and $[o^{1/2,2}]_d$ represents a $d^{th}$ element in vector $o^{1/2,2}$.

In formulas (11)-(16), the variables on the left side of the formulas are all intermediate variables in the calculation steps of the robust hierarchical recursive least squares algorithm, and their values are updated with the changes of the iteration steps.

4-3) Let a number of iterations n=2 and the following iterative update steps are performed:

$$o^{n/2,i} = o^{n-2/2,i} - \alpha_o o^{n-2} - (1-\alpha_o)o^{n-2,i} + o^{n-1}, i \in \{1,2\} \quad (17)$$

$$o^{n,1} = (R^{-1} + I/\lambda_o^a)^{-1}(R^{-1}(y-Fu) + o^{n/2,1}/\lambda_o^a) \quad (18)$$

$$[o^{n,2}]_d = [o^{n/2,2}]_d \cdot \left(1 - \frac{\lambda_{LASSO}^a \lambda_o^a}{\max\{\lambda_{LASSO}^a \lambda_o^a, |[o^{n/2,2}]_d|\}}\right), \forall d \in \{1,2,\ldots,L\} \quad (19)$$

$$o^n = (o^{n,1} + o^{n,2})/2 \quad (20)$$

4-4) Determining n:
if n is less than a set upper limit of iteration times $J_a$, letting n=n+1, and then returning to step 4-3); if n is greater than or equal to $J_a$, stopping the iteration and outputting.
$J_a$ is the fixed upper limit of the number of iterations, and the typical value can be taken as 100.

4-5) Let $\hat{F}^{t-2} = \hat{F}_a^{t-2}$, $\hat{F}^{t-1} = \hat{F}_a^{t-1}$, and according to the set initialization parameter $\dot{o}_{\omega,a}$ (a positive real number), the robust hierarchical recursive least squares is used to perform the following calculations in sequence:

$$q^t := R_{uu,t} p^{t-1}, \; p^t := q^t/\|q_t\| \quad (21)$$

$$\varpi^t := \|R_{noise,a}^1\|(p^t)^T R_{uu,t} p^t + \dot{o}_{\varpi,a} \quad (22)$$

$$\hat{F}^{t/2} := \quad (23)$$

$$\hat{F}^{t-1} + \hat{F}^{t-2/2} - \hat{F}^{t-2} + \frac{\alpha}{\varpi^{t-1}} R_{noise,a}^1 \left(\hat{F}^{t-2} R_{uu,t-1} - R_{yu,t-1} + R_{\dot{o}u,t-1}\right) -$$

$$\frac{1}{\varpi^t} R_{noise,a}^{-1}\left(\hat{F}^{t-1} R_{uu,t} - R_{yu,t} + R_{\dot{o}u,t}\right)$$

$$\hat{F}_a^t := \hat{F}^{t/2} \quad (24)$$

where $p^t$ represents a vector, when $t=t_0$, an initial value of $p^t$ is a matrix obtained by performing eigen decomposition on $u_a^{t_0}(u_a^{t_0})^T$ when $t=t_0$, and when $t>t_0$, a calculation expression is shown in formula (21). $q^t$ represents a vector, $\omega^t$ represents a real number, $\hat{F}^{t/2}$ represents a matrix corresponding to time $t$, $\hat{F}^{t-1}$ represents a matrix corresponding to time $t-1$, $\hat{F}^{t-2/2}$ and $\hat{F}^{t-2}$ represent matrixes corresponding to time $t-2$, all of which are intermediate variables in the robust hierarchical recursive least squares.
$R_{uu,t} = (1/B^t)\Sigma_{v=t_0+1}^t \beta^{t-v} u_a^v(u_a^v)^T$, $R_{yu,t} = (1/B^t)\Sigma_{v=t_0+1}^t \beta^{t-v} \tilde{y}_a^v(u_a^v)^T$, $R_{\dot{o}u,t} = (1/B^t)\Sigma_{v=t_0+1}^t \beta^{t-v} \hat{o}_a^v(u_a^v)^T$, wherein $B^t := \Sigma_{v=t_0+1}^t \beta^{t-v}$ represents a summed value with respect to $\beta$.

4-6) According to the gradient projection algorithm, control variables $x_a^{t+1}$ of the $a^{th}$ area at time $t+1$ is calculated:

$$x_a^{t+1} = P_{\chi_a^t}(x_a^t - d \times \nabla_{\chi_a} L_a) \quad (25)$$

$$\nabla_{\chi_a} L_a = \nabla_{\chi_a} f_a|_{\chi_a^t} + \sum_{\forall b \in O^a} \left\{\hat{F}_{a,b}^t\left[(\lambda_{a,b}^t)^T + \frac{\rho}{2}(\tilde{y}_{a,b}^t - \hat{o}_{a,b}^t - s_{a,b}^t)\right]\right\} \quad (26)$$

$$\nabla_{\chi_a} f_a|_{\chi_a^t} = \alpha_1 \frac{\partial v_a^t}{\partial x_a}(v_a^t - v_a^{ref}) + \frac{\alpha_2}{2}\frac{\partial p_{a\Sigma}^t}{\partial x_a} p_{a\Sigma}^t\bigg|_{\chi_a^t} = \quad (27)$$

$$\alpha_1 \hat{F}_{a,v}^t(\tilde{v}_a^t - v_a^{ref} - \hat{o}_{a,v}^t) + \frac{\alpha_2}{2} \hat{F}_{a,p\Sigma}^t(\tilde{p}_{a\Sigma}^t - \hat{o}_{a,p\Sigma}^t)$$

where d represents a step size, $P_{\chi_a^t}(x_a^t - d \times \nabla_{\chi_a} L_a)$ represents an operator of the gradient projection algorithm; $\hat{F}_{a,b}^t$, $\hat{F}_{a,v}^t$, and $\hat{F}_{a,p\Sigma}^t$ respectively represent sub-matrixes associated with measurement values of boundary variables $\tilde{y}_{a,b}^t$, measurement values of voltages $\tilde{v}_a^t$, and measurement values of active powers $\tilde{p}_{a\Sigma}^t$ in $\hat{F}_a^t$, and $\hat{o}_{a,b}^t$, $\hat{o}_{a,v}^t$, and $\hat{o}_{a,p\Sigma}^t$ respectively represent sub-items associated with measurement values of boundary variables $\tilde{y}_{a,b}^t$, measurement values of voltages $\tilde{v}_a^t$, and measurement values of active powers $\tilde{p}_{a\Sigma}^t$ in $\hat{o}_a^t$.

4-7) The controller issues $x_a^{t+1}$ to the local controlled flexibility resources (i.e., DGs), and the local DGs execute control according to the control instructions to realize the reactive voltage optimization control of this area.

4-8) The estimated values of boundary variables are calculated at time $t+1$ for all adjacent areas $b \in O^a$ by a formula of:

$$\hat{y}_{a,b}^{t+1} = \tilde{y}_{a,b}^t - \hat{o}_{a,b}^t \quad (28)$$

where $\hat{o}_{a,b}^t$ estimated values of bad data in measurements of boundary variables at time t, and is a sub-item corresponding to boundary variables in $\hat{o}_a^t$. The $a^{th}$ area and the $b^{th}$ area exchange $\hat{y}_{a,b}^{t+1}$ and $\hat{y}_{b,a}^{t+1}$ through the communication system.

4-9) Local update consistency variables at time $t+1$ are calculated according to the following formula:

$$s_{a,b}^{t+1} = \frac{\hat{y}_{a,b}^{t+1} + \hat{y}_{b,a}^{t+1}}{2}, \quad (29)$$

$$\forall b \in O^a$$

7-10) According to Nesterov accelerated gradient update method, the dual variable at time $t+1$ is updated:

$$\eta_{a,b}^{t+1} = \lambda_{a,b}^t + \rho(\hat{y}_{a,b}^{t+1} - s_{a,b}^{t+1}), \quad (30)$$

$$\forall b \in O^a$$

$$\lambda_{a,b}^{t+1} = \eta_{a,b}^{t+1} + \frac{t_{ADMM}}{t_{ADMM}+3}(\eta_{a,b}^{t+1} - \eta_{a,b}^t)$$

where $t_{ADMM}$ represents a number of iterations of the gradient projection algorithm, $\rho$ represents a penalty coefficient of the alternating direction multiplier algorithm and the typical value can be taken as 0.1, and $\eta_{a,b}^{t+1}$ represents an intermediate calculation variable corresponding to $\lambda_{a,b}^{t+1}$; The first formula in formula (30) follows the gradient descent algorithm, and the second formula represents that the updating of $\lambda_{a,b}^{t+1}$ may contain the update of the sub-representation of historical gradient information 5) Let t=t+1, and then go back to step 4).

Embodiments of a second aspect of the disclosure provide an electronic device. The electronic device comprises a processor; and a memory for storing instructions executable by the processor; wherein the processor is configured to perform the above fully-distributed reactive voltage control method.

Embodiments of a third aspect of the disclosure provide a non-transitory computer-readable storage medium having stored therein instructions that, when executed by a processor of an electronic device, causes the electronic device to perform the above fully-distributed reactive voltage control method.

In the description of the disclosure, reference throughout this specification to "an embodiment," "some embodiments," "example," "a specific example," or "some examples," means that a particular feature, structure, material, or characteristic described in connection with the embodiment or example is included in at least one embodiment or example of the disclosure. In the specification, the terms mentioned above are not necessarily referring to the same embodiment or example of the disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the disclosure, "a plurality of" means two or more than two, unless specified otherwise.

Any procedure or method described in the flow charts or described in any other way herein may be understood to comprise one or more modules, portions or parts for storing executable codes that realize particular logic functions or procedures. Moreover, advantageous embodiments of the disclosure comprises other implementations in which the order of execution is different from that which is depicted or discussed, including executing functions in a substantially simultaneous manner or in an opposite order according to the related functions, which should be understood by those skilled in the art.

The logic and/or steps described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the disclosure may be achieved by commanding the related hardware with programs. The programs may be stored in a computer readable storage medium, and the programs comprise one or a combination of the steps in the method embodiments of the disclosure when run on a computer.

In addition, each function cell of the embodiments of the disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the disclosure, and changes, modifications, alternatives and varieties can be made in the embodiments by those skilled in the art without departing from scope of the disclosure.

What is claimed is:

1. A fully-distributed reactive voltage control method, comprising:
    establishing a power grid reactive voltage optimization model of a power grid;
    parting the power grid reactive voltage optimization model into a plurality of area reactive voltage optimization models of a plurality of areas of the power grid;
    converting a power flow equation constraint in each of the plurality of area reactive voltage optimization models to a linear regression model;
    solving the linear regression model by using a robust recursive regression algorithm to obtain a solution result of the linear regression model; and
    solving each of the plurality of area reactive voltage optimization models by using the solution result of the linear regression model, a gradient projection algorithm, and an alternating direction multiplier algorithm, so as to realize a reactive voltage optimization control of each of the plurality of areas.

2. The method according to claim 1, wherein establishing the power grid reactive voltage optimization model by a formula of:

$$\min f = \alpha_1 \|v^t - v^{ref}\|^2 + \alpha_2 p_{PCC}^t$$

$$h(x^t, y^t) \leq 0$$

$$y^t = g(x^t) \tag{1}$$

where:
- $f$ represents an objective function of the power grid reactive voltage optimization model,
- superscript t represents time,
- $v^t$ represents a vector formed by voltages of controllable nodes in the power grid at time t,
- $v^{ref}$ represents an expected voltage profile of controllable nodes in the power grid,
- $p_{PCC}^t$ represents an active power at a point of common coupling (PCC) of the power grid at time t,
- $x^t$ represents a vector formed by control variables in the power grid at time t,
- $y^t$ represents a vector formed by state variables in the power grid at time t,
- $h(\cdot)$ represents operational constraints,
- $g(\cdot)$ represents power flow equation constraints that the power grid needs to satisfy,
- $\alpha_1$ represents a penalty coefficient of a voltage regulation cost, and
- $\alpha_2$ represents a penalty coefficient of an active power loss.

3. The method according to claim 2, wherein parting the power grid reactive voltage optimization model into the plurality of area reactive voltage optimization models of the plurality of areas of the power grid comprises:

noting N areas in the power grid, wherein a set of nodes in the power grid is expressed as $I := \cup_{a=1}^{N} I^a$, $I^a$ represents a set of nodes in an $a^{th}$ area in the power grid; a set of distributed generators (DGs) in the power grid is expressed as $G := \cup_{a=1}^{N} G^a$, and $G^a$ represents a set of DGs in the $a^{th}$ area in the power grid;

for the $a^{th}$ area where $a \in [1, N]$, denoting $y_a^t$ as a vector formed by state variables in the $a^{th}$ area at time t, wherein $y_a^t$ comprises internal variables $y_{a,int}^t$ and boundary variables $y_{a,adj}^t$, the boundary variables $y_{a,adj}^t$ comprise parameters of overlapping parts of the $a^{th}$ area and other areas adjacent to the $a^{th}$ area at time t, $y_{a,adj}^t$ comprise node voltage amplitudes, branch active powers, and branch reactive powers of the overlapping parts of the $a^{th}$ area and the other areas; $y_{a,adj}^t := \cup_{b \in O^a} y_{a,b}^t$, $y_{a,b}^t$ represents node voltage amplitudes, branch active powers, and branch reactive powers of an overlapping part of the $a^{th}$ area and a $b^{th}$ area, and $O^a$ represents a set of the other areas adjacent to the $a^{th}$ area; for the $a^{th}$ area where $a \in \{2, \ldots, N\}$ and that does not comprise the PCC, $y_{a,int}^t$ represents a vector formed by voltages of internal controllable nodes in the $a^{th}$ area at time t; and for the $a^{th}$ area where $a=1$ and that comprises the PCC, $y_{a,int}^t$ represents a vector formed by voltages of internal controllable nodes in the $a^{th}$ area at time t and a measurement value of the active power of the PCC at time t;

for the $a^{th}$ area, where $a \in [1, N]$, establishing the area reactive voltage optimization model by a formula of:

$$\min_{x_a^t \in X_a^t} f_a(x_a^t) = \frac{1}{2} \left( \alpha_1 \|v_a^t - v_a^{ref}\|^2 + \alpha_2 p_{a\Sigma}^t \right) \tag{2}$$

$$y_a^t = \hat{F}_a^t \times \begin{bmatrix} x_a^t \\ 1 \end{bmatrix}$$

$$y_{a,b}^t = s_{a,b}^t \ \forall \ b \in O^a$$

where:
- $f_a$ represents an objective function of the area reactive voltage optimization model of the $a^{th}$ area,
- $v_a^t$ represents a vector formed by voltages of controllable nodes in the $a^{th}$ area at time t,
- $v_a^{ref}$ represents an expected voltage profile of controllable nodes in the $a^{th}$ area,
- $y_a^t$ represents a vector formed by state variables in the $a^{th}$ area at time t,
- $x_a^t$ represents a vector formed by control variables in the $a^{th}$ area at time t,
- $s_{a,b}^t$ represents values of boundary variables between the $a^{th}$ area and the $b^{th}$ area at time t,
- $\hat{F}_a^t$ represents a parameter matrix to be estimated corresponding to the $a^{th}$ area at time t after $g(\cdot)$ is linearized, control variables $x_a^t = q_{DGa}^t = \{Q_{Ga,i}^t | i \in G^a\}$ that represent reactive power outputs of DGs of the $a^{th}$ area at time t, $Q_{Ga,i}^t$ represents a reactive power output of a DG with a node number i of the $a^{th}$ area at time t, $q_{DGa}^t$ represents a vector formed by reactive power outputs of all DGs of the $a^{th}$ area at time t;
- $p_{a\Sigma}^t$ satisfies $\Sigma_{a=1}^{N} p_{a\Sigma}^t = p_{PCC}^t$; wherein the power grid is regarded as a macro graph with the PCC as a root node, each area in the power grid is a child node of the macro graph, if $(i_a^0, j_a^0) \in L_a$ denotes a line connecting a node corresponding to the $a^{th}$ area and its parent node and $L_a^{lower-line} \subseteq L_a$ denotes a set of connection lines connecting the node corresponding to the $a^{th}$ area and its child nodes, $p_{a\Sigma}^t = p_{a(i_a^0, j_a^0)}^t - \Sigma_{(i,j) \in L_a^{lower-line}} p_{a(ij)}^t$, $p_{a(ij)}^t$ represents a branch active power on line $(i, j)$ of the $a^{th}$ area at time t, and $p_{a(i_a^0, j_a^0)}^t$ represents a branch active power on line $(i_a^0, j_a^0)$ of the $a^{th}$ area at time t;
- $\chi_a^t := \{\chi_{a,i}^t | i \in G^a\}$ represents a feasible zone of the reactive power output of the DG in the $a^{th}$ area at time t, wherein for DG $i \in G^a$ in the $a^{th}$ area at time t, a corresponding feasible zone of the reactive power output of the DG i is defined as a formula of:

$$|Q_{Ga,i}^t| \leq \sqrt{(S_{Ga,i}^t)^2 - (\overline{P}_{Ga,i}^t)^2} \tag{3}$$

wherein $S_{Ga,i}^t$ represents an installed capacity at DG i at time t, and $\overline{P}_{Ga,i}^t$ represents an active power at DG i at time t.

4. The method according to claim 3, wherein converting the power flow equation constraint in each of the plurality of area reactive voltage optimization models to the linear regression model and solving the linear regression model by using the robust recursive regression algorithm to obtain the solution result of the linear regression model comprises:

1) expressing a measurement vector of the $a^{th}$ area at time t as $\tilde{y}_a^t = [\tilde{y}_{a,int}^t; \tilde{y}_{a,adj}^t]$, where $\tilde{y}_{a,int}^t$ represents measurement values of internal state variables of the $a^{th}$ area at time t, and $\tilde{y}_{a,adj}^t$ represents measurement values of boundary variables of the $a^{th}$ area at time t;

wherein for the $a^{th}$ area where $a \in \{2, \ldots, N\}$, $\tilde{y}_{a,int}^t = \{\tilde{v}_{a,i}^t | i \in I_{observe}^a\}$, $\tilde{v}_{a,i}^t$ represents a voltage amplitude measurement at an internal observable node i of the $a^{th}$ area at time t, and $I_{observe}^a \subseteq I^a$ represents a set of observable nodes that need to be controlled in the $a^{th}$ area;

for the $a^{th}$ area where $a=1$ and that connected to the PCC, $\tilde{y}_{a,int}^t = \{\tilde{v}_{a,i}^t; \tilde{p}_{PCC}^t | i \in I_{observe}^a\}$, $\tilde{p}_{PCC}^t$ represents a measurement value of the active power of the PCC at time t;

for corresponding system measurements of each area, establishing an initial linear regression model of each area by a formula of:

$$\tilde{y}_a^t = \hat{F}_a^t \times u_a^t + \hat{o}_a^t + v_a^t, \forall a \in [1, N] \quad (4)$$

where, $\hat{F}_a^t \in \mathbb{R}^{L^a \times (G^a+1)}$ represents the parameter matrix to be estimated in the $a^{th}$ area at time t, $\tilde{y}_a^t \in \mathbb{R}^{L^a}$ represents the measurement vector of the $a^{th}$ area at time t, $u_a^t = [(x_a^t)^T, 1]^T \in \mathbb{R}^{G^a+1}$ represents auxiliary variables of the $a^{th}$ area at time t, bad data in measurements in the $a^{th}$ area at time t are modeled as a sparse vector $\hat{o}_a^t \in \mathbb{R}^{L^a}$, $v_a^t \in \mathbb{R}^{L^a}$ represents an environmental noise vector in the $a^{th}$ area at time t, $L^a$ represents a number of measurements in the $a^{th}$ area, and $G^a$ represents a number of DGs in the $a^{th}$ area;

2) transforming the model established in step 1) into a corresponding robust least squares estimation problem model as a formula of:

$$\left(\hat{F}_a^t, \{\hat{o}_a^v\}_{v=1}^t\right) \in \underset{(F, \{o^v\}_{v=1}^t)}{\operatorname{argmin}} \sum_{v=1}^t \left[\frac{1}{2}\|\tilde{y}_a^v - Fu_a^v - o^v\|^2_{R_{noise,a}^{-1}} + \lambda_{LASSO}^a \|o^v\|_1\right] \quad (5)$$

where, $\lambda_{LASSO}^a$ represents a set coefficient of the $a^{th}$ area, $R_{noise,a}$ represents a weight matrix that is set for an error of each measurement in the $a^{th}$ area, $R_{noise,a}^{-1}$ represents an inversion calculation value of the matrix $R_{noise,a}$;

3) for $\forall t \geq t_0 + 1$ converting the model established in step 2) into a regression model as a formula of:

$$\hat{o}_a^t \in \underset{o}{\operatorname{argmin}} \frac{1}{2}\left\|\tilde{y}_a^v - \hat{F}_a^{t-1} u_a^t - o\right\|^2 + \lambda_{LASSO}^a \|o\|_1 \quad (6)$$

$$\hat{F}_a^t := HRLS\left(\hat{F}_a^{t-1}, (u_a^t, \tilde{y}_a^t - \hat{o}_a^t)\right)$$

where, $t_0$ represents an initialization time parameter, HRLS $(\hat{F}_a^{t-1}, (u_a^t, \tilde{y}_a^t - \hat{o}_a^t))$ represents using a robust hierarchical recursive least squares for performing recursion and updating on a parameter matrix.

5. The method according to claim 4, wherein before solving each of the plurality of area reactive voltage optimization models by using the solution result of the linear regression model, the gradient projection algorithm, and the alternating direction multiplier algorithm, the method further comprises:
initializing model parameters;
wherein initializing the model parameters comprises:
1) denoting a dual variable in the $a^{th}$ area and corresponding to the $b^{th}$ area as $\lambda_{a,b}^t$ and initializing $\lambda_{a,b}^t$, where $b \in O^a$;
2) setting the initialization time parameter $t_0$ wherein $t_0 > G^a$, and the $a^{th}$ area using $t_0$ to initialize linear estimation parameters as a formula of:

$$\left(\hat{F}_a^{t_0}, \{\hat{o}_a^v\}_{v=1}^{t_0}\right) \in \underset{(F, \{o^v\}_{v=1}^{t_0})}{\operatorname{argmin}} \sum_{v=1}^{t_0} \left[\frac{1}{2}\|\tilde{y}_a^v - Fu_a^v - o^v\|^2_{R_{noise,a}^{-1}} + \lambda_{LASSO}^a \|o^v\|_1\right] \quad (7)$$

where $u_a^v$, $\tilde{y}_a^v$, and $\hat{o}_a^v$ respectively represent values at time t=v of $u_a^t$, $\tilde{y}_a^t$, and $\hat{o}_a^t$;

3) the $a^{th}$ area initializing local parameters as a formula of:

$$\varpi_a^{t_0} := \|R_{noise,a}^{-1}\| \|R_{uu,t_0,a}\| + \dot{o}_{\varpi,a} \quad (8)$$

-continued $$\hat{F}_a^{t_0/2} := \hat{F}_a^{t_0-1} - \frac{\alpha}{\varpi_a^{t_0}} R_{noise,a}^{-1} \left(\hat{F}_a^{t_0-1} R_{uu,t_0,a} - R_{yu,t_0,a} + R_{\hat{o}u,t_0,a}\right) \quad (9)$$

$$\hat{F}_a^{t_0} := \hat{F}_a^{t_0/2} \quad (10)$$

wherein $\tilde{\omega}_a^{t_0}$ is a real number; $\hat{F}_a^{t_0/2}$ represents a matrix at time $t_0$ and is an intermediate variable;

$\dot{o}_{\tilde{\omega},a}$ is an initialization parameter of the $a^{th}$ area; $R_{uu,t_0,a} = (1/(\Sigma_{v=1}^{t_0} \beta^{t_0-v})) \Sigma_{v=1}^{t_0} (\beta^{t_0-v} u_a^v (u_a^v)^T)$, $R_{yu,t_0,a} = (1/(\Sigma_{v=1}^{t_0} \beta^{t_0-v})) \Sigma_{v=1}^{t_0} (\beta^{t_0-v} \tilde{y}_a^v (u_a^v)^T)$, and $R_{\hat{o}u,t_0,a} = (1/(\Sigma_{v=1}^{t_0} \beta^{t_0-v})) \Sigma_{v=1}^{t_0} (\beta^{t_0-v} \hat{o}_a^v (u_a^v)^T)$, $\beta$ is a constant real number and represents a forgetting factor coefficient, $0 < \beta \leq 1$.

6. The method according to claim 5, wherein solving each of the plurality of area reactive voltage optimization models by using the solution result of the linear regression model, the gradient projection algorithm, and the alternating direction multiplier algorithm to realize the reactive voltage optimization control of each of the plurality of areas comprises:

1) obtaining the measurement vector $\tilde{y}_a^t$ of the $a^{th}$ area at time t;

2) making current auxiliary variables $u = u_a^t$, a current parameter matrix to be estimated $F = \hat{F}_a^t$, a current measurement vector of state variables $y = \tilde{y}_a^t$, a current dimension of the state variables $L = L^a$, and a current error weight matrix $R^{-1} = R_{noise,a}^{-1}$, wherein $u_a^t = [(x_a^t)^T, 1]^T$ represents an auxiliary vector of the $a^{th}$ area at time t;

using the robust hierarchical recursive least squares to perform the following calculations in sequence:

$$o^{0,1} = o^{0,2} = o^{v0} \quad (11)$$

$$o^0 = (o^{0,1} + o^{0,2})/2 \quad (12)$$

$$o^{1/2,i} = \alpha_o o^0 + (1 - \alpha_o) o^{0,i}, i \in \{1, 2\} \quad (13)$$

$$o^{1,1} = (R^{-1} + I/\lambda_o^a)^{-1} (R^{-1}(y - Fu) + o^{1/2,1}/\lambda_o^a) \quad (14)$$

$$[o^{1,2}]_d = [o^{1/2,2}]_d \cdot \left(1 - \frac{\lambda_{LASSO}^a \lambda_o^a}{\max\{\lambda_{LASSO}^a \lambda_o^a, |[o^{1/2,2}]_d|\}}\right), \quad (15)$$

$$\forall d \in \{1, 2, \ldots, L\}$$

$$o^1 = (o^{1,1} + o^{1,2})/2 \quad (16)$$

wherein, $\lambda_o^a$ is a positive real number, $o^{v0}$ is a vector representing an initial assignment of $\hat{o}_a^t$, $\alpha_o \in (0.5, 1]$ is a real number, $\lambda_{LASSO}^a$ is a positive real number, $[o^{1,2}]_d$ represents a $d^{th}$ element in vector $o^{1,2}$, and $[o^{1/2,2}]_d$ represents a $d^{th}$ element in vector $o^{1/2,2}$;

3) letting a number of iterations n=2 and performing the following iterative update steps:

$$o^{n/2,i} = o^{n-2/2,i} - \alpha_o o^{n-2} - (1 - \alpha_o) o^{n-2,i} + o^{n-1}, \quad (17)$$

$$i \in \{L2\}$$

$$o^{n,1} = (R^{-1} + I/\lambda_o^a)^{-1} (R^{-1}(y - Fu) + o^{n/2,1}/\lambda_o^a) \quad (18)$$

-continued $$[o^{n,2}]_d = [o^{n/2,2}]_d \cdot \left(1 - \frac{\lambda_{LASSO}^a \lambda_o^a}{\max\{\lambda_{LASSO}^a \lambda_o^a, |[o^{n/2,2}]_d|\}}\right), \quad (19)$$

$$\forall d \in \{1, 2, \ldots, L\}$$

$$o^n = (o^{n,1} + o^{n,2})/2 \quad (20)$$

4) determining n:

if n is less than a set upper limit of iteration times $J_a$, letting n=n+1, and then returning to step 3);

if n is greater than or equal to $J_a$, stopping the iteration and outputting;

5) letting $\hat{F}^{t-2} = \hat{F}_a^{t-2}$, $\hat{F}^{t-1} = \hat{F}_a^{t-1}$, and using the robust hierarchical recursive least squares to perform the following calculations in sequence:

$$q^t := R_{uu,t} p^{t-1}, \quad (21)$$

$$p^t := q^t / \|q_t\|$$

$$\varpi^t := \|R_{noise,a}^{-1}\| (p^t)^T R_{uu,t} p^t + \dot{o}_{\varpi,a} \quad (22)$$

$$\hat{F}^{t/2} := \quad (23)$$

$$\hat{F}^{t-1} + \hat{F}^{t-2/2} - \hat{F}^{t-2} + \frac{\alpha}{\varpi^{t-1}} R_{noise,a}^{-1} \left(\hat{F}^{t-2} R_{uu,t-1} - R_{yu,t-1} + R_{\hat{o}u,t-1}\right) -$$

$$\frac{1}{\varpi^t} R_{noise,a}^{-1} \left(\hat{F}^{t-1} R_{uu,t} - R_{yu,t} + R_{\hat{o}u,t}\right)$$

$$\hat{F}_a^t := \hat{F}^{t/2} \quad (24)$$

where $p^t$ represents a vector, when $t=t_0$, an initial value of $p^t$ is a matrix obtained by performing eigen decomposition on $u_a^{t_0}(u_a^{t_0})^T$, and when $t>t_0$, a calculation expression is shown in formula (21);

$q^t$ represents a vector, $\varpi^t$ represents a real number, $\hat{F}^{t/2}$ represents a matrix corresponding to time t, $\hat{F}^{t-1}$ represents a matrix corresponding to time t−1, $\hat{F}^{t-2/2}$ and $\hat{F}^{t-2}$ represent matrixes corresponding to time t−2, all of which are intermediate variables in the robust hierarchical recursive least squares;

$R_{uu,t} = (1/B^t) \Sigma_{v=t_0+1}^t \beta^{t-v} u_a^v (u_a^v)^T$, $R_{yu,t} = (1/B^t) \Sigma_{v=t_0+1}^t \beta^{t-v} \tilde{y}_a^v (u_a^v)^T$, $R_{\hat{o}u,t} = (1/B^t) \Sigma_{v=t_0+1}^t \beta^{t-v} \hat{o}_a^v (u_a^v)^T$, wherein $B^t := \Sigma_{v=t_0+1}^t \beta^{t-v}$;

6) according to the gradient projection algorithm, calculating control variables $x_a^{t+1}$ of the $a^{th}$ area at time t+1:

$$x_a^{t+1} = P_{\chi_a^t}(x_a^t - d \times \nabla_{x_a} L_a) \quad (25)$$

$$\nabla_{x_a} L_a = \nabla_{x_a} f_a|_{x_a^t} + \sum_{\forall b \in O^a} \left\{\hat{F}_{a,b}^t \left[(\lambda_{a,b}^t)^T + \frac{\rho}{2}(\tilde{y}_{a,b}^t - \hat{o}_{a,b}^t - s_{a,b}^t)\right]\right\} \quad (26)$$

$$\nabla_{x_a} f_a|_{x_a^t} = \alpha_1 \frac{\partial v_a^t}{\partial x_a}(v_a^t - v_a^{ref}) + \frac{\alpha_2}{2} \frac{\partial p_{a\Sigma}^t}{\partial x_a} p_{a\Sigma}^t \bigg|_{x_a^t} = \quad (27)$$

$$\alpha_1 \hat{F}_{a,v}^t(\tilde{v}_a^t - v_a^{ref} - \hat{o}_{a,v}^t) + \frac{\alpha_2}{2} \hat{F}_{a,p\Sigma}^t(\tilde{p}_{a\Sigma}^t - \hat{o}_{a,p\Sigma}^t)$$

where d represents a step size, $P_{\chi_a^t}(x_a^t - d \times \nabla_{x_a} L_a)$ represents an operator of the gradient projection algorithm; $\hat{F}_{a,b}^t$, $\hat{F}_{a,v}^t$, and $\hat{F}_{a,p\Sigma}^t$ respectively represent sub-matrixes associated with measurement values of boundary variables $\tilde{y}_{a,b}^t$, measurement values of voltages $\tilde{v}_a^t$, and measurement values of active powers $\tilde{p}_{a\Sigma}^t$, and $\hat{o}_{a,b}^t$, $\hat{o}_{a,v}^t$, and $\hat{o}_{a,p\Sigma}^t$ respectively represent sub-items associated with measurement values of boundary variables $\tilde{y}_{a,b}^t$, measurement values of voltages $\tilde{v}_a^t$, and measurement values of active powers $\tilde{p}_{a\Sigma}^t$ in $\hat{o}_a^t$;

7) executing $x_a^{t+1}$ by DGs of the $a^{th}$ area to realize the reactive voltage optimization control of the 6th area;

8) calculating estimated values of boundary variables at time t+1 for all adjacent areas $b \in O^a$ by a formula of:

$$\hat{y}_{a,b}^{t+1} = \tilde{y}_{a,b}^t - \hat{o}_{a,b}^t \quad (28)$$

where $\hat{o}_{a,b}^t$ represents estimated values of bad data in measurements of boundary variables at time t, and is a sub-item corresponding to boundary variables in $\hat{o}_a^t$;

the $a^{th}$ area and the $b^{th}$ area exchange $\hat{y}_{a,b}^{t+1}$ and $\hat{y}_{b,a}^{t+1}$;

9) calculating local update consistency variables at time t+1 according to the following formula:

$$s_{a,b}^{t+1} = \frac{\hat{y}_{a,b}^{t+1} + \hat{y}_{b,a}^{t+1}}{2}, \quad (29)$$

$$\forall b \in O^a$$

10) according to Nesterov accelerated gradient update method, updating the dual variable at time t+1:

$$\eta_{a,b}^{t+1} = \lambda_{a,b}^t + \rho(\hat{y}_{a,b}^{t+1} - s_{a,b}^{t+1}), \quad (30)$$

$$\forall b \in O^a$$

$$\lambda_{a,b}^{t+1} = \eta_{a,b}^{t+1} + \frac{t_{ADMM}}{t_{ADMM} + 3}(\eta_{a,b}^{t+1} - \eta_{a,b}^t)$$

where $t_{ADMM}$ represents a number of iterations of the alternating direction multiplier algorithm combining the gradient projection algorithm, $\rho$ represents a penalty coefficient of the alternating direction multiplier algorithm, and $\eta_{a,b}^{t+1}$ represents an intermediate calculation variable corresponding to $\lambda_{a,b}^{t+1}$;

11) letting t=t+1, and then going back to step 1).

7. An electronic device, comprising:
a processor; and
a memory for storing instructions executable by the processor;
wherein the processor is configured to:
establish a power grid reactive voltage optimization model of a power grid;
part the power grid reactive voltage optimization model into a plurality of area reactive voltage optimization models of a plurality of areas of the power grid;
convert a power flow equation constraint in each of the plurality of area reactive voltage optimization models to a linear regression model;
solve the linear regression model by using a robust recursive regression algorithm to obtain a solution result of the linear regression model; and
solve each of the plurality of area reactive voltage optimization models by using the solution result of the linear regression model, a gradient projection algorithm, and an alternating direction multiplier algorithm, so as to realize a reactive voltage optimization control of each of the plurality of areas.

8. A non-transitory computer-readable storage medium having stored therein instructions that, when executed by a processor of an electronic device, causes the electronic device to perform a fully-distributed reactive voltage control method, the method comprising:

establishing a power grid reactive voltage optimization model of a power grid;

parting the power grid reactive voltage optimization model into a plurality of area reactive voltage optimization models of a plurality of areas of the power grid;

converting a power flow equation constraint in each of the plurality of area reactive voltage optimization models to a linear regression model;

solving the linear regression model by using a robust recursive regression algorithm to obtain a solution result of the linear regression model; and solving each of the plurality of area reactive voltage optimization models by using the solution result of the linear regression model, a gradient projection algorithm, and an alternating direction multiplier algorithm, so as to realize a reactive voltage optimization control of each of the plurality of areas.

* * * * *